Aug. 1, 1972  R. B. HOLDEN  3,681,026
METHOD AND APPARATUS FOR DETERMINING THE
CARBON ACTIVITY OF FLUIDS
Filed Dec. 4, 1968

INVENTOR
Robert B. Holden
BY
ATTORNEYS

United States Patent Office 3,681,026
Patented Aug. 1, 1972

3,681,026
METHOD AND APPARATUS FOR DETERMINING THE CARBON ACTIVITY OF FLUIDS
Robert B. Holden, Scarsdale, N.Y., assignor to the United States of America as represented by the United States Atomic Energy Commission
Filed Dec. 4, 1968, Ser. No. 781,175
Int. Cl. G01n 7/12, 31/12, 33/20
U.S. Cl. 23—230 R
15 Claims

ABSTRACT OF THE DISCLOSURE

The carbon activity of a fluid of unknown carbon content is determined by bringing the carbon-containing fluid into contact with a hollow, sealed probe the walls of which are made from a material which is impervious to the fluid and in which carbon from the fluid will dissolve and diffuse. The hollow probe contains a gas which will react reversibly with carbon with a concomitant change in the total number of molecules comprising the gas present in the sealed probe. Carbon in the probe wall (present therein at a level reflecting the carbon activity of the fluid being monitored) reacts reversibly with the gas within the probe until equilibrium conditions are attained. Means are provided for determining the total number of molecules of gas contained in the sealed probe which, in turn, is a measure of the carbon activity of the fluid in contact with the sealed probe.

BACKGROUND OF THE INVENTION

(1) Field of the invention

This invention relates to methods and apparatus for measuring the carbon activity of carbon-containing fluids of unknown carbon content.

(2) Description of the prior art

Accurate determination of the carbon content, or carbon activity, of carbon-containing materials is frequently of great importance. For example, the carbon content of the molten metals such as molten sodium employed as coolants and heat transfer mediums in nuclear reactors must be kept to a minimum in order to prevent embrittlement of steel piping and other metal equipment with which the molten metal comes into contact. In other cases it may be necessary to determine more or less continuously the carbon content of gases, such as furnace gases, to maintain desired control of process conditions or furnace operation. Accordingly, the carbon content of these carbon-containing fluids must be determined either continuously, or at frequent intervals, to prevent the carbon content of the fluid from increasing above, or decreasing below, predetermined levels.

A number of procedures have heretofore been employed to determine more or less continuously the carbon content of carbon-containing fluids. One such procedure involves chemical analysis of samples of the fluid withdrawn periodically from the main body of fluid. However, chemical analysis is time consuming and cumbersome, and in many instances does not lend itself to continuous monitoring of process streams. Another procedure for measuring the carbon content of fluids takes advantage of the fact that carbon will dissolve in iron or nickel that is exposed to the carbon-containing fluid. Changes in the properties of an iron or nickel probe in contact with the fluid, or changes in the properties of a second fluid also in contact with the probe, provide a measure of the carbon content of the carbon-containing fluid medium being monitored. However, such prior art procedures for measuring the carbon content of fluids normally involve a flow of carbon out of the fluid being monitored, and as a result the measurement may be in error because the carbon content of the fluid in the vicinity of the probe is diminished in the act of measurement.

SUMMARY OF THE INVENTION

I have now devised an improved method and apparatus for determining the carbon activity, or carbon content, of a carbon-containing fluid which does not consume or withdraw a significant amount of carbon from the carbon-containing fluid in the act of measurement of the carbon activity. My improved carbon activity measuring device comprises a hollow, sealed metal probe that is adapted to contact, and preferably to be immersed in, the carbon-containing fluid the carbon activity of which is to be measured. The hollow probe is formed from an impervious material such as iron or nickel in which elemental carbon will dissolve and diffuse at the operating temperature of the device. The probe is initially filled with a known quantity of a gas that will react with carbon with an accompanying change in the number of molecules comprising the gas present in the sealed probe. One such gas comprises a mixture of carbon monoxide and carbon dioxide. The sealed probe is connected to means for detecting any change in the number of molecules of gas contained in the sealed probe and for determining the magnitude of any such change. Means for accomplishing this result include a pressure sensitive meter or a constant pressure gas volume meter. The change in the number of molecules of gas contained in the sealed probe, as determined by the pressure gauge or by the gas volume meter, is a measure of the change in the carbon content of the gas which, in turn, is dependent on the carbon activity of the carbon-containing fluid with which the sealed probe is in contact.

When the carbon-containing fluid medium of unknown carbon activity is brought into contact with the outer surface of the sealed probe, carbon from the fluid medium will dissolve and diffuse in the fluid-impervious probe until the carbon content of the material from which the probe is made is in equilibrium with the carbon content of the fluid medium. Carbon at the inner surface of the hollow probe reacts reversibly with the gas contained in the probe until equilibrium conditions are established. When the gas contained in the probe comprises a mixture of carbon monoxide and carbon dioxide the reversible reaction may be represented by the following equation:

$$C + CO_2 \rightleftharpoons 2CO$$ 

Equilibrium conditions are quickly established at which time the relative amounts of carbon monoxide and carbon dioxide in the gas are stabilized at levels reflecting the carbon activity or carbon content of the fluid being monitored.

Depending upon the carbon activity of the carbon-containing fluid and upon the composition of the gas initially present in the sealed probe, the total number of molecules comprising the gas contained in the probe is increased or decreased in accordance with the foregoing reaction. Upon establishment of stable equilibrium conditions the change in the total number of molecules comprising the gas in the closed system is determined by known methods, for example by measurement of the change in pressure of the gas contained in a system of constant volume or by measurement of the change in volume of the gas in the system at a constant pressure. The change in pressure (or volume) of the gas contained in the sealed probe is, therefore, a reliable measure of the carbon activity of the carbon-containing fluid being monitored.

BRIEF DESCRIPTION OF THE DRAWINGS

The method and apparatus for measuring the carbon activity of carbon-containing fluids in accordance with my invention will be better understood from the following detailed description thereof in conjunction with the accompanying drawings of which.

DETAILED DESCRIPTION

Figure 1:
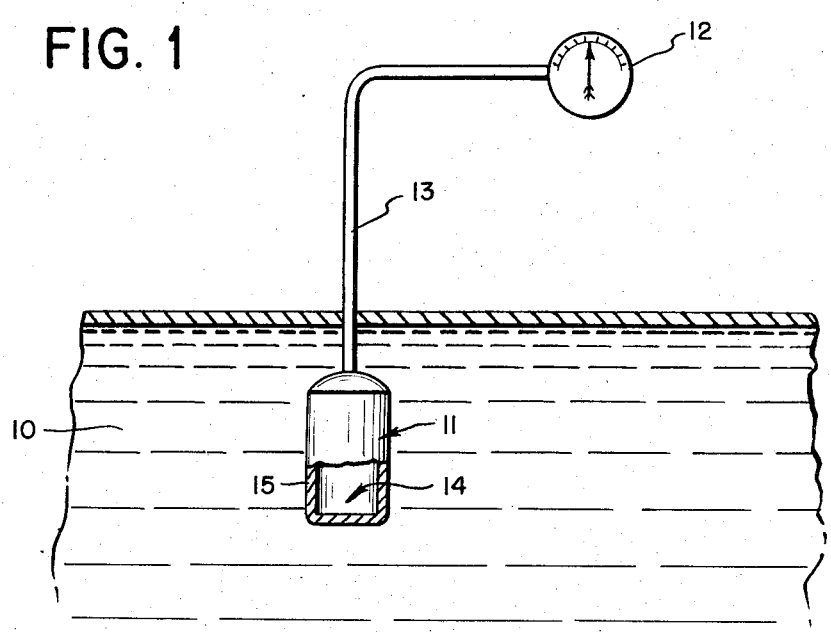
FIG. 1 is a schematic view, partly in section, of an advantageous embodiment of the carbon meter of my invention.

As shown in FIG. 1 of the drawing, the carbon meter of my invention is adapted to measure the carbon activity of a carbon-containing fluid 10 of unknown carbon content. In the embodiment shown in FIG. 1, the major components of my carbon meter comprise a hollow probe 11 that is adapated to contact, and preferably to be immersed in, the carbon-containing fluid 10, a pressure gauge 12 (or equivalent device), and a conduit 13 connecting the hollow probe 11 with the pressure gauge 12, the probe 11, conduit 13 and gauge 12 comprising a closed, gas-tight system. The hollow probe 11 and conduit 13 are initially filled with a known quantity of a gas 14 of known composition, the gas 14 being one which will react with carbon with an accompanying change in the total number of molecules comprising the gas.

The walls 15 of the hollow probe 11 are formed from a material that is impervious with respect to the fluid 10 and that will not react with this fluid at the operating temperature of the device. Moreover, the material from which the probe walls are made is one in which carbon from the fluid 10 will dissolve and diffuse when the probe is brought into contact with the fluid as shown in the drawing. Materials which meet these requirements include, but are not limited to, nickel, iron and nickel-iron alloys.

The hollow probe is filled with a gas 14 that will react with carbon with a concomitant change in the total number of molecules comprising the gas. Such a gas includes, but is not limited to, a mixture of carbon monoxide and carbon dioxide. The composition and the quantity of the gas initially introduced into the probe 11 are known or are determined by conventional procedures. In a closed system such as that shown in FIG. 1, this known quantity of gas will have an initial pressure that is indicated by the pressure gauge 12. Moreover, the pressure gauge 12 will detect any change in the pressure of the gas contained in the closed system and will measure the magnitude of this change, thereby providing means for determining any change in the total number of molecules comprising the gas contained in the system.

When the hollow probe 11 is brought into contact with the carbon-containing fluid 10, for example, by immersing the probe in the fluid as shown in FIG. 1, carbon from the fluid will dissolve and diffuse throughout the walls of the probe 11 until the carbon content of the walls 15 is in equilibrium with the carbon content of the fluid 10. The mixture of carbon monoxide and carbon dioxide comprising the gas 14 in the probe 11 can serve either as a carbon acceptor or a carbon donor in accordance with the reversible reaction:

(1)  $\qquad C + CO_2 \rightleftharpoons 2CO$

Whether the gas will accept carbon from the probe wall 15 or will donate carbon to the wall 15 depends upon the relative carbon activity of the gas 14 and the wall 15 (which, in turn, is dependent on the carbon activity of the carbon-containing fluid 10). If the carbon activity of the probe wall 15 and the gas 14 are the same, no transfer of carbon between the two will take place. However, if the carbon activity of the wall 15 is greater than that of the gas 14, carbon from the probe wall will react with carbon dioxide to form carbon monoxide in accordance with Equation 1 until the carbon activity of the gas 14 equals that of the probe wall 15, whereupon stable equilibrium conditions are established. Similarly, if the carbon activity of the probe wall 15 is less than the carbon activity of the gas 14, the gas 14 will donate carbon to the probe wall in accordance with Equation 1 until the carbon activity of the gas has been reduced to that of the probe wall, whereupon stable equilibrium conditions are again established. The reaction of carbon with carbon dioxide to form carbon monoxide results in an increase in the total number of molecules comprising the gas contained in the closed system. Conversely, the donation of carbon by the gas 14 to the tube wall 15 results in a decrease in the total number of molecules comprising the gas contained in the closed system. This increase or decrease in the total number of molecules comprising the gas 14 in the system is reflected by an increase or decrease in the pressure of the gas as measured by the pressure gauge 12.

Upon establishment of equilibrium conditions, the carbon activity of the gas 14 is equivalent to the carbon activity of the carbon-containing fluid 10. I have found that the carbon activity of the gas may be represented by the following expression:

(2) $$Ac = \frac{P}{K_1} \left( \frac{(N_{CO})^2}{N_{CO_2}} \right)$$

where:

$Ac$ is the carbon activity of the gas
$P$ is the pressure exerted by the $CO$-$CO_2$ mixture
$K_1$ is a constant which depends only on temperature
$N_{CO}$ is the mol fraction of $CO$ in the gas mixture
$N_{CO_2}$ is the mol fraction of $CO_2$ in the gas mixture As the initial pressure and composition of the gas 14 in the closed system are known, any transfer of carbon to or from the gas 14 in accordance with Equation 1 will result in a change in the pressure P as well as a change in the carbon monoxide and carbon dioxide ratio. However, the change in the carbon monoxide and carbon dioxide ratio is readily computed from the change in pressure as measured by the gauge 12. Accordingly, the carbon activity of the gas (and hence the carbon activity of the fluid 10) can be determined from the Expression 2.

The practice of my invention is illustrated by the following example.

The probe 11 and conduit 13 are initially filled to a pressure of 1 atmosphere with a mixture of 50 mol percent CO and 50 mol percent $CO_2$ at a temperature of 1020° K. I have found that at this temperature the value of $K_1$ in the Expression 2 is approximately 2.94. Accordingly, the initial carbon activity in the $CO$-$CO_2$ mixture is 0.17 from Expression 2. If the carbon activity in the fluid 10 surrounding the probe 11 is also 0.17, there is no tendency for carbon to move in either direction and the pressure of the gas 14 will remain at one atmosphere. However, if the carbon activity in the fluid being monitored is greater than 0.17, carbon will move through the wall 15, react with carbon dioxide in accordance with Reaction 1 and increase the gas pressure as measured on the pressure gauge 12. On the other hand, if the carbon activity in the fluid being monitored is less than 0.17, carbon will migrate from the probe wall 15, the gas 14 will donate carbon to the probe wall in accordance with Equation 1 and the gas pressure in the probe will decrease. Hence the gas pressure in the probe gives a direct measure of the carbon activity of any fluid medium with which it is equilibrated.

I have found that the calibration for the meter operated at the above parameters (temperature of 1020° K., initial pressure (at 1020° K.) of 1 atm. and an initial fill of 50 mol percent CO, 50 mol percent $CO_2$) is as follows:

| P (mm. Hg): | Ac (relative to graphite) |
|---|---|
| 836 | 0.457 |
| 760 | 0.170 |
| 684 | 0.0459 |
| 608 | 0.0039 |

The fill pressure determines the most sensitive operating range of the instrument, and the range may be readily changed simply by changing the fill pressure. If, in the above example, the initial pressure had been set at 0.1 atmosphere rather than 1 atmosphere, the activity corresponding to unchanged pressure would be 0.017. The calibration in this case is:

| P (mm. Hg): | Ac (relative to graphite) |
|---|---|
| 91.2 | 0.110 |
| 83.6 | 0.0457 |
| 76.0 | 0.0170 |
| 68.4 | 0.00459 |
| 60.8 | 0.00039 |

In general, as the fill pressure is reduced, the values of Ac which the meter can measure accurately are correspondingly lowered. Accordingly, the fill pressure can be used to change the useful range of the instrument. Operating the meter at a lower initial fill pressure, in addition to increasing the sensitivity of the instrument at low values of Ac, increases the speed with which the meter responds to a change in carbon activity. This results from the fact that the number of atoms of carbon which must be transported through the probe wall to achieve equilibrium varies directly with the fill pressure.

The carbon-containing fluid 10 may, in some cases, contain a minor amount of hydrogen gas dissolved therein or admixed therewith. Moreover, the nickel or iron wall 15 of the probe 11 is permeable with respect to hydrogen gas. As a result, hydrogen from the fluid 10 tends to migrate through the wall 15 into the gas 14 contained in the probe 11. Hydrogen thus tends to accumulate in the probe 14 and to build up a small but appreciable partial pressure which must be taken into account when computing the carbon activity of the gas 14 in accordance with Expression 2. In the device shown in FIG. 1, this could require an independent determination of the hydrogen partial pressure in the gas 14 in order to obtain a correct value for the carbon activity of the gas 14.

Figure 2:
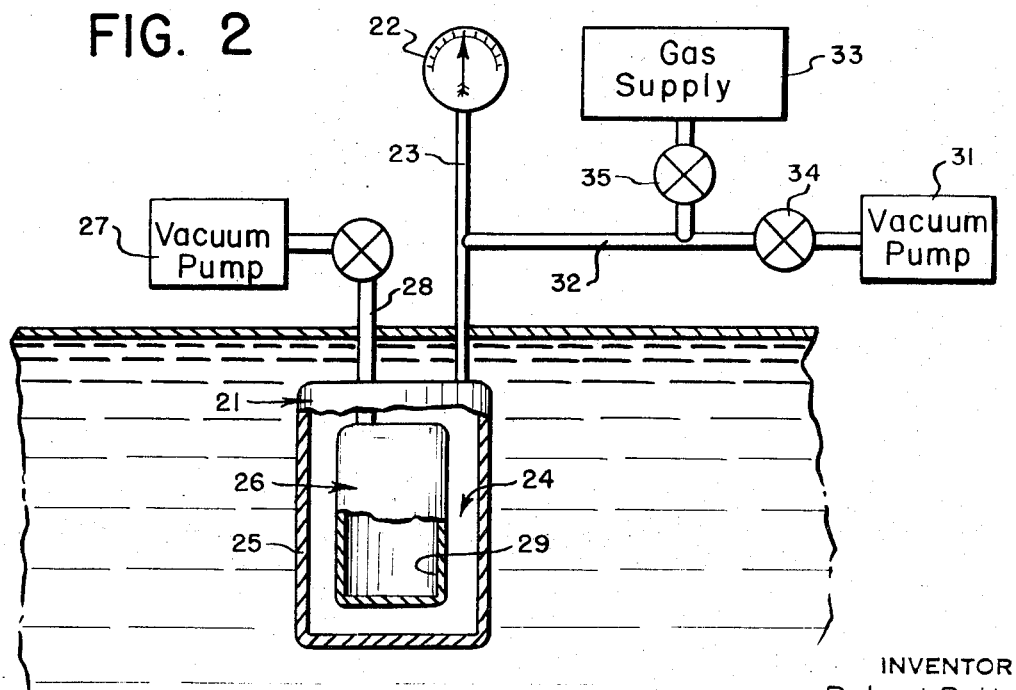
FIG. 2 is a schematic view, partly in section, of an advantageous modification of the carbon meter of my invention.

In the modification of my device shown in FIG. 2, means are provided for removing hydrogen from the gas 24. In the modified device the hollow probe 21 is connected to a pressure gauge 22 by means of a conduit 23 to form a closed system filled with a gas 24 capable of reacting with carbon that diffuses through the wall 25 of the probe from the carbon-containing fluid 10 being monitored. A bulb 26 formed from a metal such as platinum or palladium is disposed within the probe 21, the bulb 26 being connected to a vacuum pump 27 by means of the conduit 28. Since platinum or palladium have a much higher hydrogen permeability than nickel or iron, the hydrogen in the gas 24 tends to migrate into the interior 29 of the bulb 26 from which it is removed by the vacuum pump 27. As a result, the partial pressure of hydrogen in the gas 24 is kept at a level so low that it cannot influence significantly the reading on the pressure gauge 22. The pressure gauge 22, therefore, will provide a direct and reliable indication of any change in the number of molecules comprising the gas 24 due to reaction between this gas and carbon at the inner surface of the probe wall 25.

The modification of my device shown in FIG. 2 also embodies means for filling the probe 21 with a predetermined quantity of a carbon acceptor/donor gas 24 at a known temperature and pressure. The gas fill means comprises a vacuum pump 31 connected to the conduit 23 by a branch conduit 32 and a gas supply 33 means also connected to the conduit 23 by the branch conduit 32. In practice, the probe 21 is evacuated by means of the vacuum pump 31 whereupon the valve 34 is closed. The valve 35 is then opened to allow the predetermined quantity of gas 24 to fill the probe 21, whereupon the valve 35 is closed.

In the embodiment of my invention shown in the drawing, the means for detecting the change in the number of molecules comprising the gas contained in the probe 11 or 21 is a pressure sensitive instrument such as the pressure gauges 12 and 22. In an alternative modification the change in the number of molecules comprising the gas can be determined by constant pressure volume measurements of the gas. The calibration table for the gas volume variations at constant pressure of the carbon meter of my invention (operated at 1020° K., 1 atm. pressure, initial fill 50 mol percent CO, 50 mol percent $CO_2$) is as follows:

| $\Delta V$ (cm.$^3$/cm.$^3$): | Ac |
|---|---|
| +0.1 | 0.416 |
| 0 | 0.170 |
| −0.1 | 0.051 |
| −0.2 | 0.00486 |

As with the constant volume meter, the operating range of the constant pressure meter can be changed simply by changing the initial fill pressure. A type of gas buret that can be employed as a constant pressure gas volume meter in the practice of the invention is described in an article by H. A. Booth entitled "The Baro-Buret, A New Accurate Gas Buret" published on pages 182–186 of the Apr. 15, 1930 issue of the Analytical Edition of Industrial and Engineering Chemistry (vol. 2, No. 2).

I claim:

1. A device for measuring the carbon activity of a carbon-containing fluid which comprises
    a closed, hollow probe adapted to contact a carbon-containing fluid of unknown carbon activity, the probe being formed from a material which is impervious and inert with respect to said fluid and in which elemental carbon will dissolve and diffuse,
    a predetermined quantity of a gas disposed in said closed hollow probe, said gas being capable of reversibly reacting with carbon with a concomitant change in the total number of molecules comprising said gas, and
    detector means connected to said hollow probe for detecting any change in the total number of molecules comprising said gas and for determining the magnitude of said change, said hollow probe and said detector means comprising a closed gas-tight system containing said gas.

2. The device according to claim 1 in which the hollow probe is formed from a fluid-impervious material selected from the group consisting of nickel, iron and iron-nickel alloys.

3. The device according to claim 1 in which the gas contained in the hollow probe comprises a mixture of carbon monoxide and carbon dioxide.

4. The device according to claim 1 in which the means for determining the magnitude of the change in the total number of molecules comprising the gas is a pressure gauge.

5. The device according to claim 1 in which the means for determining the change in the total number of molecules comprising the gas in the hollow probe is a constant pressure gas volume meter.

6. The device according to claim 1 in which the hollow probe is connected to means for filling the probe with a known quantity of a gas of known composition.

7. The device according to claim 1 in which the hollow probe is provided with means for removing hydrogen from the gas contained in the probe.

8. The device according to claim 7 in which the means for removing hydrogen from the gas contained in the probe comprises a hollow bulb formed from a metal selected from the group consisting of platinum and palladium, said bulb being connected to a vacuum pump.

9. The process for measuring the carbon activity of a carbon-containing fluid which comprises:
contacting the carbon-containing fluid of unknown carbon activity with one surface of a layer of a material that is impervious to said fluid and in which elemental carbon will dissolve and diffuse at the temperature of the fluid,
contacting the opposite surface of said layer of fluid-impervious material with a known finite quantity of a gas of known composition, said gas being capable of reacting with carbon with a concomitant change in the total number of molecules comprising said gas, and
measuring any change in the total number of molecules comprising said gas after equilibrium reaction conditions have been established whereby the carbon activity of the gas may be determined.

10. The process according to claim 9 in which the layer of fluid-impervious material is formed from a material selected from the group consisting of nickel, iron and iron-nickel alloys.

11. The process according to claim 9 in which the gas contacting the opposite surface of said layer of fluid-impervious material comprises a mixture of carbon monoxide and carbon dioxide.

12. The process according to claim 9 in which the change in the total number of molecules comprising the gas is determined by measurement of the change in pressure of a constant volume of said gas.

13. The process according to claim 9 in which the change in the total number of molecules comprising the gas is determined by measurement of the change in the volume of the gas at a constant pressure.

14. The process according to claim 9 in which said carbon-reactive gas is contacted with one surface of a layer of a material that is more permeable with respect to hydrogen than said layer of fluid-impervious material, and in which the other surface of said layer of hydrogen-permeable material is exposed to a high vacuum.

15. The process according to claim 14 in which the layer of hydrogen-permeable material is selected from the group consisting of platinum and palladium.

References Cited
UNITED STATES PATENTS

| | | | |
|---|---|---|---|
| 2,671,337 | 3/1954 | Hulsberg | 73—23 |
| 3,451,256 | 6/1969 | Kolodney | 73—19 X |
| 3,221,537 | 12/1965 | Jacobsen | 73—23 |

OTHER REFERENCES

Booth, H. S., Anal. Chem. 2, No. 2, Apr. 15, 1930, pp. 182–186.

MORRIS O. WOLK, Primary Examiner

R. M. REESE, Assistant Examiner

U.S. Cl. X.R.

23—253 R; 73—19 R, 23 R